Kellogg & Coan,
Knob Attachment.

Nº 18,911.  Patented Dec. 22, 1857.

UNITED STATES PATENT OFFICE.

C. D. KELLOGG AND W. L. COAN, OF BOSTON, MASSACHUSETTS.

GLASS KNOB FOR DOORS.

Specification of Letters Patent No. 18,911, dated December 22, 1857.

*To all whom it may concern:*

Be it known that we, CHARLES D. KELLOGG and WILLIAM L. COAN, of Boston, in the county of Suffolk and State of Massachusetts, have invented a new and useful Improvement in the Manufacture of Transparent Glass Knobs for Doors; and we do hereby declare that the same is fully described and represented in the following specification and the accompanying drawings, of which—

Figure 2:
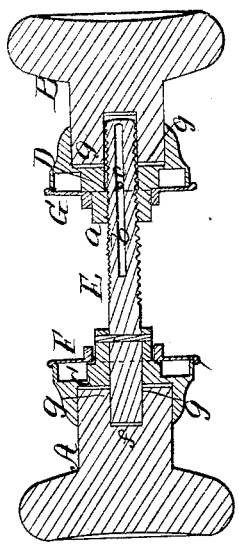
Figure 1:
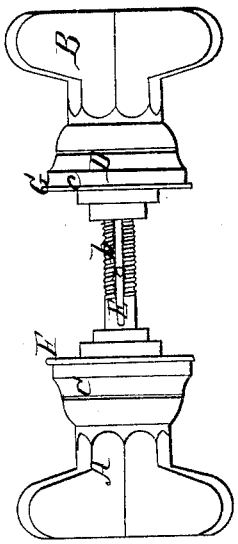

Figure 1. exhibits a side view of a pair of extension knobs containing our improvement. Fig. 2. a longitudinal section of the same.

As our invention is particularly useful in its application to extension knobs, we have represented such in the drawings illustrative of our said invention.

In the said drawing, A. and B. denote a pair of transparent glass knobs, each of which is inserted and cemented in a metallic socket C. or D.

A metallic shank E extending from one of the sockets, screws into the other socket as shown at, *a*, in Fig. 2, and has a slot, *b*, formed through it for the reception of a pin, *c*, which is passed through the socket and the said slot. When this pin is not in place, we can vary the distance between the two sockets by revolving upon the screw of the shank E, that one which screws upon it. When the proper distance between the knobs has been obtained the pin should be put in place and it will prevent the socket from rotating on the screw. F. and G. are the journal plates in which the knob socket turns, such journal plates being generally screwed to the door as is well understood.

In constructing such extension knobs it has been customary to form the handle or glass part thereof of a non-transparent material and this because of the necessity of making such part of the knob with a cavity or recess for the reception of the shank. If made of transparent glass the shank would be seen through the glass and to the injury of the appearance of the knob.

Our improved knob is made of transparent glass and with a cavity or recess, *e*, for the reception of the shank E the same being made to extend axially into the knob as shown in Fig. 2. In and against and so as to cover the bottom of the said cavity we place a disk or plate, *f*, of silver foil so that the planished surface of the same may be in direct contact with said bottom. And furthermore, we place against the end of that part of the glass knob which is inserted in the metallic socket and so as to cover the whole of said part and extend around the shank E or the cavity, *e*, for the reception thereof, an annulus of foil, *g*, the planished side of the annulus being against the glass. It is not essential to cover the inner surface of the sides of the recess or cavity, *e*, with foil as the uncovered sides by reflection of light by the annulus of foil will appear to be so covered to a spectator when looking endwise into the knob or in other words, when looking into the outer end of the knob. The foil or the glass may be creased or indented so that the creases or indentations at the bottom of the recess may be respectively in line with those of the inner end of the knob.

We are fully aware that it is common to place a piece of foil in the metallic socket of a glass knob and between the bottom of the same and its end or foot of the knob when said foot is made without any shank cavity. Therefore we do not claim such, our improvement resting on a particular arrangement of the foil in a transparent glass knob made with a recess for the reception of the shank as described.

We are also cognizant of the door knob, which constitutes the subject of a patent granted on the 16th day of January, A. D. 1855, to the New England Glass Company, as assignee of William Leighton. This knob differs entirely from the solid glass knob having our improvement. While the knob of Leighton is constructed with its handle part made as a hollow vessel having its whole internal surface covered with a film of silver precipitated thereon from a solution of nitrate of silver, our invention differs entirely from a glass knob whose handle part is a solid block or mass of glass having the proper form and made with a cavity only as large as may be necessary to receive the shank and allow it to move longitudinally to the extent that may be desirable. Therefore the structures of the glass part of the knob in question, differ materially. Our improvement is in no way applicable to the knob of Leighton and cannot be applied to it. We do not cover with either silver or foil, the sides of the shank recess as we have found that this is entirely unnecessary when the bottom of it is so covered, and its top is surrounded by an annulus as described. Our invention thus saves all the labor and expense of so covering the said sides, and besides it enables us to make use of a simple disk and annulus of silver foil (both of which may be made from one circular disk of foil) in the place of using the process of precipitating silver from a solution of it as above stated.

Therefore what we claim consists in arranging on the bottom of the cavity, *e*, a plate or disk of foil in combination with arranging an annulus of foil around the mouth of the cavity and against the glass knob as specified.

In testimony whereof we have hereunto set our signatures.

C. D. KELLOGG.
W. L. COAN.

Witnesses:
R. H. EDDY,
F. P. HALE, Jr.